(No Model.)
E. F. McMURTREY.
CAR COUPLING.
No. 593,950. Patented Nov. 16, 1897.
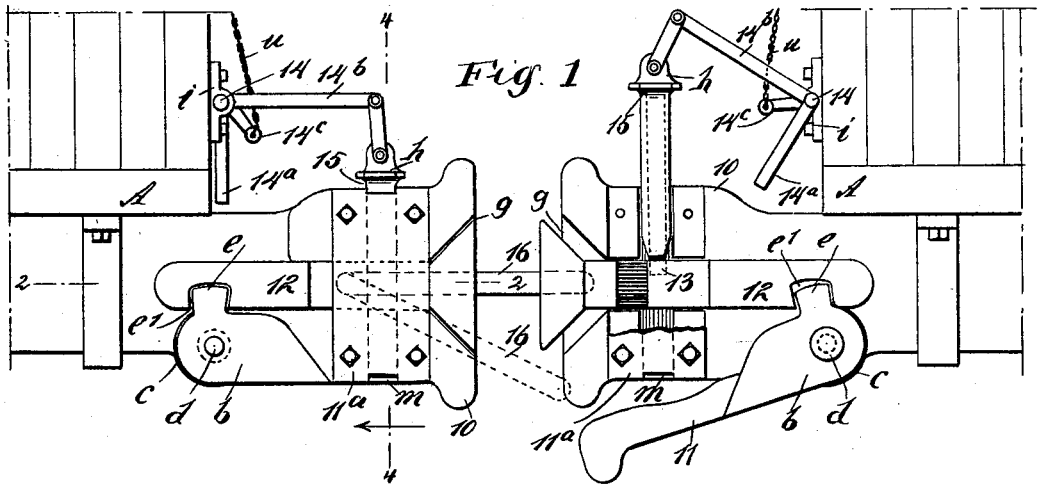
Fig. 1
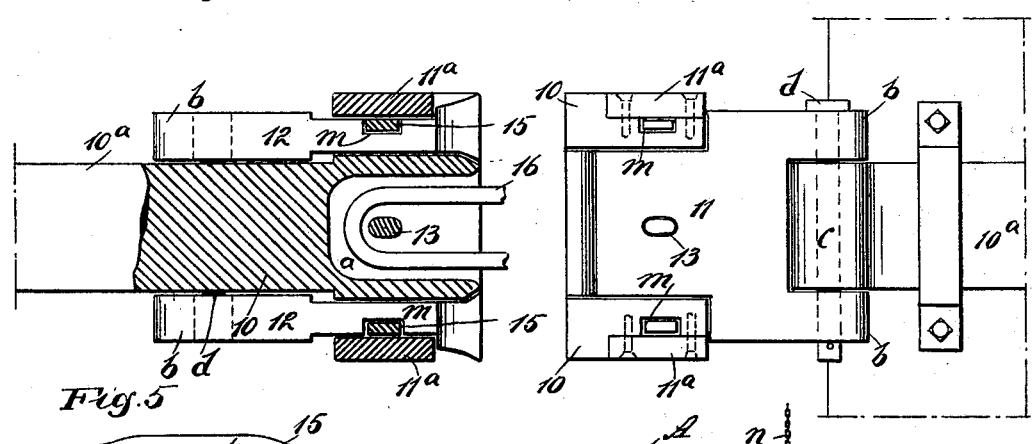
Fig. 2    Fig. 3
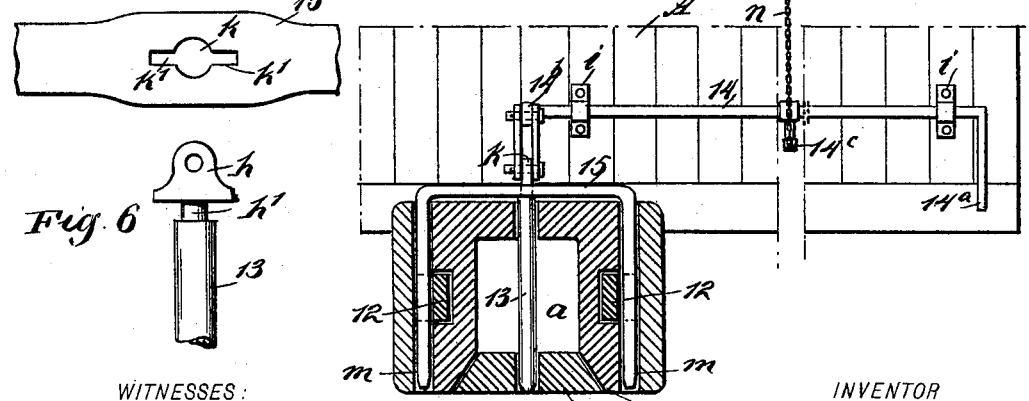
Fig. 5
Fig. 6
Fig. 4
WITNESSES:
Johna Bingham
Wm P. Patton
INVENTOR
E. F. McMurtrey
BY
ATTORNEYS.

UNITED STATES PATENT OFFICE.

ELISHA F. McMURTREY, OF RISON, ARKANSAS.

CAR-COUPLING.

SPECIFICATION forming part of Letters Patent No. 593,950, dated November 16, 1897.

Application filed June 23, 1897. Serial No. 641,904. (No model.)

*To all whom it may concern:*

Be it known that I, ELISHA F. MCMURTREY, of Rison, in the county of Cleveland and State of Arkansas, have invented a new and Improved Car-Coupling, of which the following is a full, clear, and exact description.

This invention relates to gravity pin-and-link car-couplings, and has for its object to provide a novel car-coupling of the indicated type which is simple in construction, automatic in operation when coupling with another draw-head having a link, and adapted for safe detachment from the side or roof of the car.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a side elevation of the front ends of two cars having the improved car-couplings in condition to couple, one coupling having a side plate in part removed to expose the interior construction. Fig. 2 is a sectional plan view of one car-coupling, taken substantially on the line 2 2 in Fig. 1, and of a link in part coupled thereto. Fig. 3 is a reverse plan view of the car-coupling shown at the right-hand side of Fig. 1. Fig. 4 is a front elevation of a car-body in part and a transverse sectional view of the coupling thereon, taken, essentially, on the line 4 4 in Fig. 1. Fig. 5 is an enlarged fragmentary plan view of a novel guide-yoke for the coupling-pin, and Fig. 6 is an enlarged side view of the upper portion of the coupling-pin.

The draw-head 10 of the improved car-coupling is integrally formed on the forward end of the draw-bar $10^a$, and these parts are supported upon the frame of a car-body A by any preferred means, such a connection being provided therefor as will adapt the coupling for efficient service, to secure which it is essential that the draw-head be projected somewhat in advance of the car-frame to receive the impact of another car-coupling. The draw-head 10 is rectangular in cross-section and recessed from the front end rearwardly, so as to produce a suitable chamber $a$ therein, as shown in Figs. 2 and 4. The chamber $a$ is also rectangular in cross-section and open at the lower side, producing three walls, two at the sides and one at the top of the draw-head, as is clearly shown in Fig. 4.

An apron 11 is fitted in the open lower side of the draw-head 10, and, preferably, the side edges of said apron are sloped from their upper edges outwardly and downwardly, so as to mate with like slopes or beveled inner lower edges of the draw-head. The apron 11 is furnished with two ears $b$, which project rearwardly from its rear end along the sides of the same, and said ears loosely embrace and are pivoted upon a boss $c$, that is an integral depending projection from the draw-head near its junction with the draw-bar. The pivot-bolt $d$ occupies alined holes in the ears and boss and is loosely secured therein by a cross-key at one end and a head at the other, as indicated in Fig. 3. In longitudinally-formed channels located at each side of the draw-head 10 and directly above the apron 11 slide-bars 12 are loosely secured by keeper-plates $11^a$, the latter being held in place by screw-bolts or like means.

On the upper edge of each bar $b$ a toggle-boss $e$ is formed or secured, and said bosses loosely enter suitably-shaped notches $e'$, formed to receive them in the lower edges of the slide-bars 12 near their rear ends, this engagement of parts adapting the longitudinal reciprocation of the slide-bars to correspondingly rock the apron 11 on its pivot-bolt, the gravity of the latter serving to normally project the slide-bars somewhat in advance of the front end of the draw-head. The slide-bars 12 are enlarged at their front ends, thus producing buffer-heads thereon, that are preferably sloped on their upper and lower edges from the front rearwardly, as shown in Fig. 1, said heads fitting into corresponding recesses $g$, formed at the front ends of the channels wherein the slide-bars are located, which permits the buffer-heads of the slide-bars to receive proper adjustment rearwardly and prevents their projection at the front of the draw-head when the apron 11 is elevated to a level position.

At the transverse center of the draw-head 10 the top and bottom walls thereof are suitably perforated for the loose introduction of the coupling-pin 13, which has a rounded body and is furnished with a laterally-flattened head $h$.

A rock-shaft 14 is rockably supported on the car-body A by the journal-boxes $i$, and said shaft extends to the side of the car and has a crank-handle $14^a$ at this end to enable a convenient and safe rocking adjustment of the shaft from the ground at one side of the car.

In the same vertical plane with the pin 13 an arm $14^b$ is projected from the rock-shaft 14 in an outward direction, said arm at its outer end being shackled to the upper end of the coupling-pin. It will be seen that a rocking upward adjustment of the arm $14^b$ will elevate the coupling-pin, which, when lowered, enters the perforation made to receive it in the lower wall of the draw-head.

A guide-yoke 15 is provided for the control of the coupling-pin 13. Said yoke, which is best shown in Fig. 4, consists of a flat bar bent at its ends to produce two legs. The body of the coupling-pin 13 is reduced in diameter immediately below the flattened head $h$, as shown at $h'$ in Fig. 6, thus producing a locking-shoulder on said pin. At the transverse center of the top horizontal bar of the guide-yoke 15 a vertical perforation $k$ is produced, the diameter of said perforation permitting the free insertion of the reduced part $h'$ of the coupling-pin 13. At each side of the circular perforation $k$ oppositely-extending slots $k'$ are formed, and said slots are of such relative dimensions as will allow the pin-head $h$ to pass through them.

It will be seen that if the pin-head $h$ is inserted through the hole $k$ and slots $k'$ and the pin-body 13 is given one-fourth of a revolution the head $h$ will be disposed across the yoke-bar and the pin be locked thereto.

At a correct distance from the front end of the draw-head 10 two opposite vertical passages $m$ are formed in the side walls of the draw-head, said parallel passages being designed to freely receive the depending legs of the guide-yoke 15, the removable keeper-plates $11^a$ covering the legs and preventing a displacement of the same. The passages $m$ cross the slide-bars 12 on their outer sides and form recesses therein at points which adapt said recesses to aline with other portions of the vertical passages when the slide-bars are rearwardly adjusted to the full extent of their travel, and consequently when the apron 11 is rocked up into a level position.

The operation is as follows: Assuming that a coupling-link 16 of ordinary construction is held in a draw-head 10 on a car A by a coupling-pin 13 and the link is projected from said draw-head, as shown at the left side of Fig. 1, then if the rock-shaft 14 is rocked so as to lift the pin 13 on an opposing draw-head 10, and thus permit the apron 11 to assume the position shown at the right side of Fig. 1, the link 16 will ride up on the inclined apron and be guided by it into the draw-head should said link hang drooped in the position indicated by dotted lines in Fig. 1. As the gravity of the apron 11 projects the slide-bars 12 beyond the forward end of the draw-head when in lowered adjustment, as shown at the right side in Fig. 1, the solid portions of the slide-bars will be disposed below the lower ends of the legs on the guide-yoke 15, which yoke will then rest upon the bars and maintain the coupling-pin 13 in elevated adjustment. On the approach of one car to the other sufficiently to impinge the draw-heads 10 upon each other the forwardly-projected heads of the slide-bars 12 will first be struck and said slide-bars will be rearwardly moved, which will rock the apron 11 up into a level position. When the bars 12 slide rearwardly, the recesses in their sides, forming parts of the vertical passages $m$, are alined with other portions of said passages, which will permit the pin 13 to drop by the gravity of its body through the entered end of the link 16 and automatically couple said link to the draw-head.

On the rock-shaft 14 another arm $14^c$ is formed or secured so as to project outwardly, and from the outer end of said arm a flexible connection $n$ is upwardly extended to the roof of the car-body and may be secured thereto, thus affording means for rocking the shaft by draft upon the connection $n$, so as to lift the pin 13 and detach two coupled draw-heads 10.

It will be evident that any ordinary link-and-pin car-coupling may be coupled to the improved car-coupling if a link 16 is first coupled to the ordinary draw-head and projects therefrom.

Having thus described my invention, I claim as new and desire to secure by Letters Patent—

1. The combination with a chambered draw-head, a vertically-slidable coupling-pin therein, a guide-yoke vertically slidable on the draw-head and connected with the pin, said yoke having two spaced depending legs, and means for manually adjusting the pin and yoke from the side or roof of a car, of an apron having ears at the rear end embracing the draw-head and pivoted thereon, said apron having toggle-bosses projecting upwardly from the ears thereon, and two longitudinally-slidable bars on the draw-head, having notches wherein the toggle-bosses loosely engage, said bars being projected in advance of the draw-head by the gravity of the apron, said apron inclining downwardly when the coupling-pin is elevated, substantially as described.

2. In a car-coupling of the character described, the combination with the draw-head having a chamber extending from the front end rearwardly, and an apron having rearwardly-projecting ears at the sides thereof, which ears embrace the draw-head and are pivoted thereto, of slide-bars loosely secured at the sides of the draw-head above the ears of the apron, and toggle-joint connections between the rear ends of the slide-bars and the ears of the apron, whereby the rocking depression of said apron by its gravity is adapted to slidably project the bars in advance of the draw-head, substantially as described.

3. In a car-coupling of the character described, the combination with the draw-head, of the arched guide-yoke having two parallel limbs which are slidable in vertical recesses formed in the side walls of the draw-head, said yoke being centrally perforated in its upper portion, and a coupling-pin having a flattened head and its body grooved below said head, the head of the pin being insertible in the perforation of the guide-yoke, and securable therein by a partial rotation of the pin-body, substantially as described.

ELISHA F. McMURTREY.

Witnesses:
J. W. CASH,
J. S. MOORE.